United States Patent
Heeb et al.

(10) Patent No.: US 7,891,540 B2
(45) Date of Patent: Feb. 22, 2011

(54) SOLDERING WORK PIECE, SOLDERING METHOD AND HEAT EXCHANGER

(75) Inventors: Wolfgang Heeb, Schorndorf (DE); Wolfgang Knödler, Waiblingen (DE); Cord Völker, Backnang (DE)

(73) Assignee: BEHR GmbH & Co. KG, Stuttgart (DE)

( * ) Notice: Subject to any disclaimer, the term of this patent is extended or adjusted under 35 U.S.C. 154(b) by 112 days.

(21) Appl. No.: 10/571,288

(22) PCT Filed: Aug. 5, 2004

(86) PCT No.: PCT/EP2004/008801

§ 371 (c)(1), (2), (4) Date: Mar. 9, 2006

(87) PCT Pub. No.: WO2005/028152

PCT Pub. Date: Mar. 31, 2005

(65) Prior Publication Data

US 2007/0023481 A1 Feb. 1, 2007

(30) Foreign Application Priority Data

Sep. 11, 2003 (DE) .................................. 103 42 242

(51) Int. Cl.
*B23K 31/00* (2006.01)
(52) U.S. Cl. .................................................. 228/248.1
(58) Field of Classification Search ................ 228/248.1
See application file for complete search history.

(56) References Cited

U.S. PATENT DOCUMENTS

| | | | | |
|---|---|---|---|---|
| 3,666,869 A | * | 5/1972 | Orecchia | 219/632 |
| 3,747,199 A | | 7/1973 | Swaney, Jr. | |
| 3,844,777 A | * | 10/1974 | Werner | 420/528 |
| 3,966,506 A | * | 6/1976 | Mandigo et al. | 148/695 |
| 3,986,897 A | * | 10/1976 | McMillan et al. | 438/510 |
| 5,193,739 A | | 3/1993 | Liedke et al. | |
| 5,300,209 A | * | 4/1994 | Mori | 205/325 |
| 5,618,357 A | * | 4/1997 | Knepper et al. | 148/528 |

FOREIGN PATENT DOCUMENTS

| | | |
|---|---|---|
| DE | 32 06 809 A1 | 2/1983 |
| DE | 195 02 746 A1 | 7/1996 |
| DE | 102 10 217 A1 | 10/2003 |
| EP | 0 363 580 A1 | 4/1990 |
| JP | 11-012762 A | 1/1999 |
| WO | WO 03/076113 A1 | 9/2003 |

OTHER PUBLICATIONS

Toh et al. "An investigation of the native oxide of aluminum alloy 7475-T7651 using XPS, AES, TEM, EELS, GDOES and RBS", Surface Review and Letters, vol. 10, Issue 02-03 pp. 365-371, published Jun. 2003.*

(Continued)

*Primary Examiner*—Jessica L Ward
*Assistant Examiner*—Nicholas P D'Aniello
(74) *Attorney, Agent, or Firm*—Foley & Lardner LLP

(57) ABSTRACT

The invention relates to a soldering work piece made of aluminium and/or aluminium compounds, to a soldering method, in addition to a heat exchanger soldered in said manner. One surface of the soldering work piece is provided with an artificially applied oxide layer.

7 Claims, 1 Drawing Sheet

OTHER PUBLICATIONS

D.J. Schmatz et al., "A Fluxless Process for Brazing Aluminum Heat Exchangers in Inert Gas," Welding Journal, American Welding Society, vol. 62, No. 10, Oct. 1, 1983, pp. 31-38.

Dabase WPI Week 199913 Thomson Scientific, London, GB, AN 1999-148989 & JP 11-012762 A (Mitsubishi Aluminium CO., Ltd.) Jan. 19, 1999.

* cited by examiner

SOLDERING WORK PIECE, SOLDERING METHOD AND HEAT EXCHANGER

BACKGROUND

The invention relates to a soldering workpiece made from aluminum and/or aluminum compounds, to a soldering process and to a heat exchanger soldered in this manner.

To join two metallic workpieces by means of a soldered join, it is necessary for the oxide layer formed at the surfaces of the workpieces to be at least partially removed prior to the soldering operation and not to be formed again during the soldering process. This is generally achieved using special soldering agents for metal oxides, known as fluxes. At present, for example for the brazing of aluminum components for heat exchangers, as are used in the automotive industry, it is customary to use special soldering processes, in particular what is known as the "Nocolok" soldering process using fluxes based on potassium fluoroaluminates.

Even the application of the fluxes is often very complex and expensive. Furthermore, the components are covered with fluxes after the soldering operation, often requiring complex cleaning treatment and/or other surface treatments following the soldering process in order to meet industry requirements for desired properties of components, such as corrosion-resistant, hydrophilic and/or bonding surfaces and/or to comply with aspects such as cleanness, product design or appearance. For example, the flux which is commercially available under the trade name "Nocolok" remains on the surface after the soldering of aluminum components, covering it with a crystalline layer which has to be subjected to further cleaning and conversion treatments depending on the intended use. Moreover, the use of fluxes has an adverse effect on the environment and the equipment and machines used, which are exposed to high levels of wear, causing a short service life. Furthermore, it becomes more difficult to use materials containing zinc and/or magnesium, since the zinc or magnesium reacts with the flux, thereby increasing the consumption of flux and affecting the materials properties.

SUMMARY

To avoid these drawbacks, it is desirable to provide a process for soldering aluminum in which the surface of a soldering workpiece made from aluminum or aluminum compounds no longer needs to be provided with a flux.

Flux-free removal or cracking open of the oxide layer formed at the metallic surface can be achieved by a pretreatment of the associated workpiece by applying a plating to the solder, for example the process known as nickel-aluminum soldering, or by evaporating elements, for example magnesium, out of the base material or the solder plating during vacuum soldering.

In the case of flux-free brazing and high-temperature soldering in specially developed, electrically heatable vacuum furnaces, the vacuum acts as a reducing atmosphere. This makes it possible to achieve metallically bright surfaces for the solder to wet the components to be joined and prevents the growth of metal oxide layers. However, drawbacks of vacuum soldering are the technically complex and therefore expensive soldering installations required and the expensive pretreatment for cleaning the workpieces which are to be soldered.

Therefore, the invention is based on the object of providing a soldering workpiece and a soldering process for flux-free soldering which can be realized economically and without major outlay on a large industrial scale as an alternative to soldering with fluxes.

To form a stable soldered join, there is provision for the solder to be allowed to flow between the workpieces which are to be joined to one another from the workpiece or from the outside. Accordingly, it should be possible to crack open or at least partially remove the oxide and/or hydroxide layer covering the soldering workpiece, so that the solder can penetrate into inhomogeneities, such as notches, pores, cracks or the like, which have formed in the oxide and/or hydroxide layer and can ensure a reliable soldered join between the workpieces that are to be joined.

The base material of the workpiece which adjoins the oxide and/or hydroxide layer in this case has a different thermal expansion than the oxide and/or hydroxide layer itself, with the result that, on account of the heating during the soldering operation, stresses are built up in the oxide and/or hydroxide layer and in the boundary region between the base material and the oxide and/or hydroxide layer.

The native oxide and/or hydroxide layer, which is formed on all the surfaces of workpieces made from aluminum or aluminum compounds that are exposed to ambient air, usually has a thickness of less than 10 nm and may be up to 20 nm thick in the case of humid air. On account of this low thickness, the oxide and/or hydroxide layer has a flexibility, so that the thermal stresses within the oxide and/or hydroxide layer can be dissipated.

A core concept of the invention is that of deliberately selecting the thickness, such as the mean thickness, of the oxide and/or hydroxide layer in such a way that thermal stresses can no longer be dissipated on account of the flexibility within the oxide and/or hydroxide layer. During heating to soldering temperature, the stresses become so great that inhomogeneities, in particular notices, pores and/or cracks, are formed in the oxide and/or hydroxide layer, in particular in the vertical direction with respect to the surface of the soldering workpiece, and that the oxide and/or hydroxide layer under certain circumstances becomes at least partially detached. Liquid solder material can then penetrate into the cracks or between the workpiece and the oxide and/or hydroxide layer.

The object of the invention is therefore achieved by virtue of the fact that the thickness of the oxide and/or hydroxide layer arranged at a surface of the soldering material is greater than the thickness of a native oxide and/or hydroxide layer. A thickness of greater than 25 nm is advantageous and a thickness of greater than 50 nm is particularly preferred.

If the thickness of the oxide and/or hydroxide layer is particularly great, the desired crack formation is made more difficult on account of internal stability of the oxide and/or hydroxide layer, and consequently a layer thickness of less than 1000 nm, preferably less than 500 nm is advantageous.

With standard soldering conditions for aluminum materials, i.e. temperatures approximately between 500° C. and 660° C., a thickness of the oxide and/or hydroxide layer of between 80 nm and 250 nm has proven particularly advantageous for the flux-free soldering of workpieces, in particular heat exchanger parts made from aluminum or aluminum compounds.

Known, preferably chemical or electrochemical or physical processes are expediently used to produce an oxide layer prior to the soldering. A suitable chemical production process is, for example, the boehmite process, with the result that the oxide and/or hydroxide layer advantageously predominantly comprises boehmite, with an exposure time of from one minute to one hour, in particular from one minute to fifteen minutes, and a temperature of from 80° C. to 150° C., in particular 100° C. to 120° C., being selected. In this case, it is customary to use water, which may also contain chemicals. A temperature of between 15° C. and 80° C. is also suitable for a workpiece temperature of up to 550° C. Alternatively, the surface of the workpiece can also be treated electrochemically in order to form an oxide layer. By way of example, the known Eloxal, standing for electrolytic oxidation of aluminum, is used for this purpose, with an exposure time of from one minute to one hour, in particular from one minute to 10 minutes, a temperature of from 20° C. to 50° C. and a voltage of 40 V. As an example of physical production of a defined oxide layer, it is possible to use the PVD (physical vapor deposition) process, in which preferably a bias voltage of −40 V and a coating pressure of from 0.1 mbar to 1 mbar are set. Another option is to form mixed oxide layers which consist of aluminum oxides and/or other oxides and can be produced by a chemical reaction.

On account of the formation of an oxide and/or hydroxide layer which permits the formation of inhomogeneities for the solder that is to be introduced, a pretreatment of this type carried out on the workpieces to be joined is particularly suitable especially for standardized large-series production.

A further core concept of the invention is that of assisting the breaking-open and/or flaking-off of the oxide and/or hydroxide layer by influencing its morphology in a targeted way and if appropriate pretreating the aluminum surface of the workpiece to allow it to be particularly well wetted by solder material.

According to an advantageous embodiment, this is achieved with the aid of inhomogeneities, such as for example notches, pores and/or cracks or the like, in the oxide and/or hydroxide layer. These inhomogeneities are preferably introduced into the oxide and/or hydroxide layer by chemical and/or thermal and/or mechanical treatment of the workpiece.

Preferably during or after an oxidation operation, a lubricant, which advantageously contains halogen, is applied for example to the soldering workpiece, i.e. to the oxide and/or hydroxide layer. During the subsequent heating step as part of the soldering operation, the modification of the oxide layer implemented in this way promotes the formation of inhomogeneities, and the aluminum surface which is uncovered is activated by the halogen compounds, in such a manner that it can be wetted with solder.

The elimination of a process step of applying flux allows a thermal degreasing operation and a soldering operation to be carried out jointly in one soldering furnace, for example in a continuous furnace. It is particularly advantageous for the two process steps to be carried out during a single heating operation.

A heat treatment is preferably integrated in a degreasing process which may be required in any case and is carried out for the removal of lubricants. It is particularly preferable for the heat treatment and if appropriate the thermal degreasing to be integrated in the soldering operation, so that only a single heating operation is required. This allows the process outlay to be reduced further.

To simplify the process sequence, it is preferable for the application of the in particular halogen-containing lubricants to take place preferably during the preceding machining processes carried out on the material, such as the deep-drawing, cutting, punching and the like, which for process engineering reasons already require lubrication.

Furthermore, reoxidation at the locations where the oxide layer has broken open needs to be suppressed without major additional outlay. For this purpose, the halogen-containing lubricants contain additives which are broken open when heated and the constituents of which have an affinity for oxygen, so that they bond the oxygen in the immediate vicinity of the actual workpieces to be joined, thereby improving the soldering atmosphere and the flow of solder. In this context, carboxylic acids, amines, sulfur compounds and/or phosphorus compounds may advantageously be used as oxygen-bonding additives or constituents. The soldering operation itself can also be positively influenced by the additives and/or constituents.

Under a shielding gas atmosphere, magnesium is retained in relatively large quantities, i.e. it does not evaporate to the same extent as under a vacuum, and can therefore facilitate the distribution of the liquid solder and contribute to improving the strength properties of the workpiece following the soldering process. On the other hand, the partial evaporation of the magnesium can assist with the breaking-open of the oxide layer described above, and reoxidation of the aluminum surface can be suppressed when the magnesium diffuses to the surface as a result of its reaction with the residual oxygen which is present there to form magnesium oxide (MgO). Therefore, a base material made from aluminum with a high magnesium content is expediently used for the soldering. In a particularly advantageous configuration of the process, a base material made from aluminum with a magnesium content of greater than 0.2%, in particular greater than 0.5%, and in particular less than 2%, is used.

A shielding gas atmosphere which has a reducing action over the entire temperature range expediently contributes to ensuring that the aluminum surface is not reoxidized and that the oxide layer which is still present does not grow further. Therefore, during heating and soldering, shielding gas, advantageously hydrogen, argon or nitrogen, is used; nitrogen is particularly inexpensive. Furthermore, the use of a shielding-gas continuous furnace allows a high degree of automation of this manufacturing process.

The process described is used for the flux-free soldering of aluminum components, such as for example tubes, plates, fins or semi-finished products, such as strips for a heat exchanger, in particular in the automotive industry. The soldering workpieces according to the invention preferably have a layer of solder material which consists of an aluminum compound.

The advantages achieved by the invention are in particular that prior to the shielding gas soldering, it is possible to dispense with the use of fluxes in the soldering, on account of a surface of a soldering workpiece made from aluminum and/or aluminum compounds being provided with an oxide and/or hydroxide layer and on account of in particular halogen-containing lubricants being applied during or after the oxidation. This absence of fluxes leads to reduced environmental pollution and reduced wear to equipment, and therefore a longer equipment service life. Moreover, it becomes possible or at least easier to use materials containing zinc and/or magnesium for the shielding-gas soldering.

In this context, the application of the halogen-containing lubricants makes it possible to assist with breaking open and/or flaking off the oxide and/or hydroxide layer during the soldering operation and also causes the aluminum surface to be activated in favor of improved solder wetting; reoxidation of the uncovered aluminum surface is at least made more difficult, in particular by the additives or constituents of the lubricants which have an affinity for oxygen. The shielding gas atmosphere, which has a reducing action over the entire temperature range, also contributes to the latter feature. Consequently, the inhomogeneities formed during heating can be filled with solder in such a manner as to allow the formation of fixed and permanent soldered joins.

The result is a particularly economical and relatively simple process for the flux-free soldering of aluminum or aluminum compounds which ensures the formation of particularly stable soldered joins, for example of aluminum components for heat exchangers, with a reproducibly constant quality, as required in particular for large-scale industrial use, especially for series production in the automotive industry.

BRIEF DECRIPTION OF THE DRAWINGS

An exemplary embodiment of the invention is explained in more detail below with reference to a drawing, in which.

DETAILED DESCRIPTION

Figure 1:
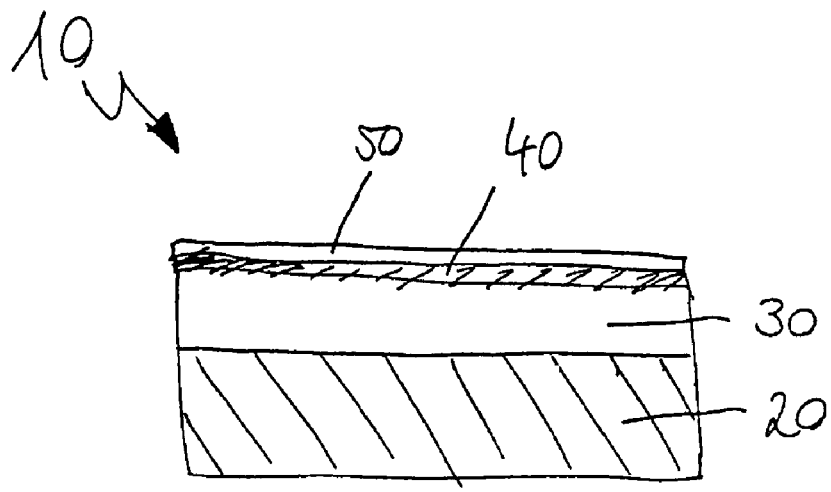
FIG. 1 shows a soldering workpiece in accordance with the present invention.

FIG. 1, which is not to scale, shows a soldering workpiece 10 having a base body 20 made from an aluminum alloy, which has been provided with a solder plating 30 of an aluminum alloy with a thickness of approximately 0.1 mm. A boehmite layer 40 with a thickness of approximately 100 nm has been applied to the surface of the solder plating 30.

A lubricant 50 serves to facilitate cutting or punching processes prior to the soldering process. The lubricant 50 can be applied during or after the oxidation to produce the boehmite layer.

Figure 2:
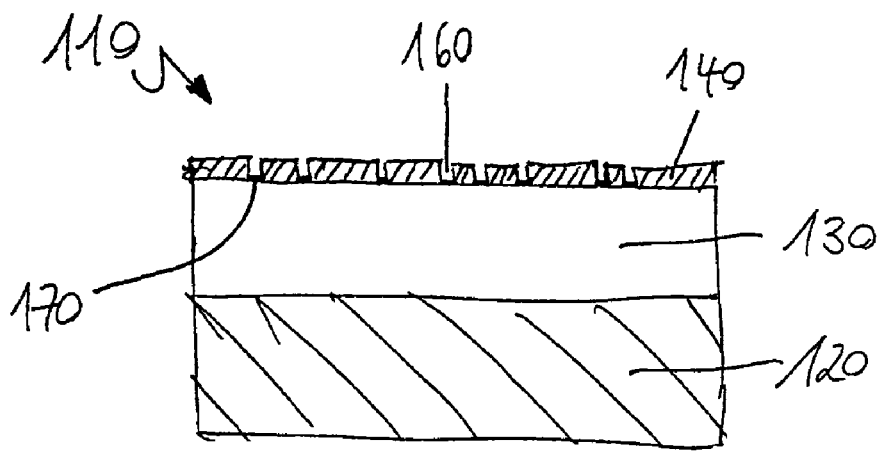
FIG. 2 shows a soldering workpiece in accordance with the present invention.

FIG. 2 shows a soldering workpiece 110 having a base body 120 and a solder plating 130 which has been covered with an inhomogeneous oxide and/or hydroxide layer 140. The oxide and/or hydroxide layer 140 has notches, pores and/or cracks 160, in which the solder plating 130 is covered only with a native oxide and/or hydroxide layer 170 with a thickness of approximately 1 nm to 5 nm. These inhomogeneities 160 can be produced, for example, during a thermal degreasing operation, in particular when a halogen-containing lubricant is being removed. At high temperatures, the halogens effect and/or promote the formation of inhomogeneities of this nature.

The soldering locations of two workpieces which have been pretreated in this manner and are to be joined are suitably positioned in a manner which is known and therefore not illustrated. Then, the entire arrangement is introduced into a shielding gas furnace, in particular, for automation reasons, into a shielding-gas continuous furnace, in which the pretreated workpieces are heated.

This leads on the one hand (FIG. 1) to stresses in the boehmite layer 40 and in the boundary region between the solder plating 30 and boehmite layer 40. On heating to the soldering temperature, if appropriate with the assistance of the halogen-containing lubricant 50, these stresses lead to the formation of notches, pores and/or cracks in the boehmite layer 40, preferably in the vertical direction with respect to the surface of the solder plating 30, and to the boehmite layer 40 becoming partially detached from the solder plating 30. On the other hand (FIG. 2), the oxide and/or hydroxide layer 140 likewise becomes partially detached from the solder plating 130 on account of the notches, pores and/or cracks 160.

Figure 3:
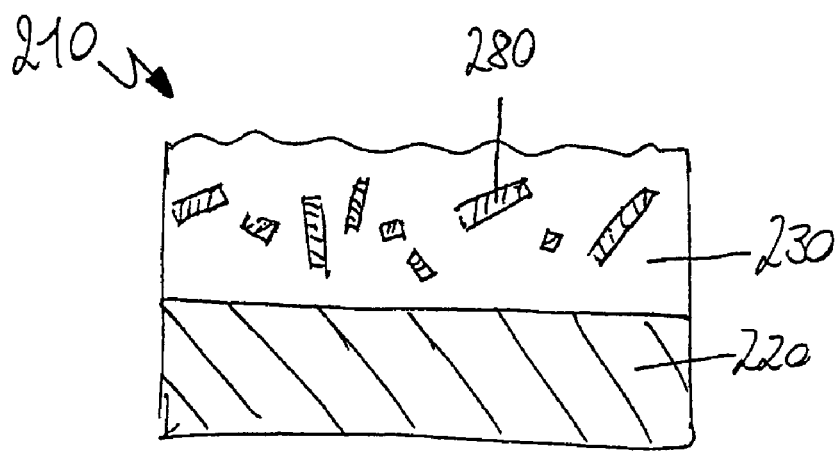
FIG. 3 shows a soldering workpiece during a soldering process according to the invention.

As illustrated in FIG. 3, the solder material 230 of the solder plating, during the soldering operation, flows and/or washes around the detached fragments 280 of the boehmite or oxide and/or hydroxide layer. As a result, the liquefied solder material 230 can wet the base body 220, consisting of aluminum, of the workpiece 210, with the result that desired soldered joins are formed.

The invention claimed is:

1. A soldering process for joining at least two workpieces to one another, comprising:

providing a soldering workpiece made from aluminum and/or aluminum compounds, wherein the soldering workpiece comprises a solder plating comprising an aluminum compound at a surface of the soldering workpiece and an oxide and/or hydroxide layer arranged at a surface of the solder plating, wherein a thickness d of the oxide and/or hydroxide layer is up to 20 nm, increasing the thickness d of the oxide and/or hydroxide layer to a thickness sufficient to provide contact between a soldering compound and the solder plating underneath the oxide and/or hydroxide layer during a subsequent soldering process, introducing inhomogeneities into the oxide and/or hydroxide layer, and soldering the soldering workpiece to another workpiece.

2. The soldering process as claimed in claim 1, wherein the thickness of the oxide and/or hydroxide layer after the increasing step is greater than 25 nm.

3. The soldering process as claimed in claim 1, wherein the oxide and/or hydroxide layer separates into fragments that detach from the soldering workpiece during the soldering step.

4. The soldering process as claimed in claim 1, wherein the inhomogeneities are introduced by a halogen-containing lubricant.

5. The soldering process as claimed in claim 2, wherein 25 nm<d<1000 nm.

6. The soldering process as claimed in claim 1, wherein the inhomogeneities comprise notches, pores and/or cracks.

7. The soldering process as claimed in claim 1, wherein the step of increasing the thickness d of the oxide and/or hydroxide layer comprises heating the soldering workpiece to a temperature of 80° C. to 150° C. or electrochemically treating the soldering workpiece.

* * * * *